United States Patent [19]
Plunkett

[11] Patent Number: 5,067,852
[45] Date of Patent: Nov. 26, 1991

[54] METHOD AND APPARATUS FOR REMOVING VOLATILE CONTAMINENTS FROM CONTAMINATED SOIL

[75] Inventor: James B. Plunkett, Brunswick, Me.

[73] Assignee: J. B. Plunkett Associates, Inc., Brunswick, Me.

[21] Appl. No.: 528,581

[22] Filed: May 24, 1990

[51] Int. Cl.$^5$ .............................................. B09B 1/00
[52] U.S. Cl. .................................. 405/128; 210/170; 405/129; 405/258
[58] Field of Search ................... 405/128, 129, 52, 53, 405/258; 210/610, 170, 805

[56] References Cited

U.S. PATENT DOCUMENTS

| 3,874,175 | 4/1975 | Winters | 405/128 |
| 4,519,338 | 5/1985 | Kramer et al. | 405/128 X |
| 4,745,850 | 5/1988 | Bastian et al. | 405/128 X |
| 4,765,902 | 8/1988 | Ely et al. | 405/128 X |
| 4,849,360 | 7/1989 | Norris et al. | 405/128 X |
| 4,850,745 | 7/1989 | Hater et al. | 405/128 X |
| 4,919,570 | 4/1990 | Payne | 405/128 |

FOREIGN PATENT DOCUMENTS

| 3425788 | 1/1986 | Fed. Rep. of Germany | 405/128 |
| 3601490 | 7/1987 | Fed. Rep. of Germany | 405/128 |

Primary Examiner—Dennis L. Taylor
Attorney, Agent, or Firm—Barry Evans

[57] ABSTRACT

A method and apparatus for removing volatile contaminants from contaminated soil is provided wherein the contaminated soil is excavated and stockpiled upon a vapor-tight support structure. The contaminated soil is covered and sealed with an impervious vapor-tight liner such that a vapor-tight enclosure is created. A vacuum is created in the vapor-tight enclosure which induces air flow through the contaminated soil to volatilize contaminants from the contaminated soil. Vapors created as a result of the induced air flow are exhausted from the system and treated or managed as required by federal, state, or municipal regulatory requirements.

15 Claims, 2 Drawing Sheets

METHOD AND APPARATUS FOR REMOVING VOLATILE CONTAMINENTS FROM CONTAMINATED SOIL

BACKGROUND OF THE INVENTION

This invention relates to a method and apparatus for removing volatile contaminants from contaminated soil, and more particularly, to a method and apparatus for removing volatile contaminants from contaminated soil which involves vapor tight containment of the contaminated soil and volatilization of the organic contaminants ("VOCs") by inducing air flow through the containment system.

Contamination of soils is an ever-increasing problem in today's society. Contamination has typically been caused as a result of spills, dumping of hazardous liquids, leakage from underground storage tanks, etc., where the contaminants are retained by the subsurface soil. An immediate health threat is posed when these contaminants descend hydrodynamically into the groundwater. Additionally, the balance of the ecosystem is severely disturbed as surrounding plant and animal life is directly affected by the contaminated soil. It is thus desirable to develop a method and apparatus to remove the volatile contaminants from the contaminated soil.

Often, excavation of the soil is required to immediately remove and reduce the source of contamination at a site where a discharge of volatile organic contaminants has occurred. Excavation is typically required when immediate removal and management of the contaminated soil is either required by federal, state or municipal regulations or is determined to be required as an immediate response effort to reduce the source of the contamination. Examples of situations where excavation of the soil is often implemented include underground storage tank removals, emergency responses to accidental spills of hazardous materials, and excavation of uncontrolled hazardous material disposal sites, etc.

The primary method of management of contaminated soil resulting from underground storage tank and source removals has been and is presently off-site disposal at a landfill. This is the most expensive remedial option for management of contaminated soils and creates additional liability for the generator because the disposal site could most likely become a future uncontrolled hazardous waste site and require the disposed materials to be remanaged. On-site treatment methods for excavated soils include thermally enhanced vaporization, which requires heating and rotating of contaminated soils in a cylindrical container, such as is described in U.S. Pat. No. 4,748,921, and solvent stripping, which requires separation of the solids in the soil and leaching of contaminants from the solids with a leaching solvent, such as is described in U.S. Pat. Nos. 4,801,384 and 4,869,825. In these prior on-site treatment methods for excavated soils, process flow volumes are limited due to design constraints and substantial capital is required for initial development and construction of the technology.

Several methods for removing VOCs from contaminated soils in situ are known and described. The primary drawback for application of in situ technology is that the extent and occurrence of contamination in the subsurface must be adequately defined via field exploration methods prior to implementation. Additionally, field investigation results may indicate site limiting conditions which would prohibit application of in situ technology. Site limiting conditions for application of in situ technology include: shallow depth to bedrock, irregular bedrock topography, shallow depth to water table, heterogeneous subsurface materials such as fill, and confining subsurface strata.

In situ methods for removing VOCs are described in U.S. Pat. Nos. 4,834,194; 4,850,745; 4,849,360; 4,745,850; 4,593,760; 4,730,672; and 4,842,448. U.S. Pat. No. 4,834,194 describes a method in which an apparatus protrudes into, agitates, and heats a subsurface volume of soil. U.S. Pat. Nos. 4,849,360 and 4,850,745 disclose methods for treating soils contaminated with organic compounds and petroleum hydrocarbons, respectively, which involve aerobic biodegradation of contaminants. Both methods require a population of microorganisms capable of degrading the specific contaminants to be effective. In situations where the soils are extremely contaminated, conditions within the soil matrix are often found to be toxic to these microorganisms, and therefore, these methods are not effective for all applications. U.S. Pat. Nos. 4,745,850; 4,593,760; 4,730,672 and 4,842,448 describe methods for removing volatile organic VOCs from contaminated soil in situ using vapor extraction methods.

OBJECTS OF THE INVENTION

It is a primary object of the invention to provide a method and apparatus for removing volatile contaminants from contaminated soil which avoids the aforementioned disadvantages of the prior art.

It is a further object of the invention to provide a method and apparatus for removing volatile contaminants from contaminated soil which is cost-efficient and is adaptable to site limiting conditions.

It is still a further object of the invention to provide a method and apparatus for removing volatile contaminants from contaminated soil which does not require off-site disposal at a landfill.

It is still a further object of the invention to provide a method and apparatus for removing volatile contaminants from contaminated soil which is readily adapted to sites wherein immediate removal and management of contaminated soils is either required by regulation or is required as an immediate response effort.

Various other objects, advantages, and features of the invention will become readily apparent from the ensuing detailed description, and the novel features will be particularly pointed out in the appended claims.

SUMMARY OF THE INVENTION

In accordance with the invention, a method and apparatus for removing volatile contaminants from contaminated soil is provided. A granular bed providing support for a containment structure is overlaid with an impervious vapor-tight liner. The soil containing the volatile organic contaminants ("VOCs") is excavated and stockpiled on top of the liner. Perforated air distribution pipes and air-VOC-exhaust pipes are positioned in the soil stockpile. The stockpile is covered with a vapor-tight liner so that a vapor-tight enclosure is formed between the lower and upper liners. An air inlet pipe and a vent pipe connected to the air distribution pipe and exhaust-VOC pipes, respectively, protrude through the otherwise sealed enclosure. A vacuum pump associated with the vent pipe is used to induce an air flow into, through, and, subsequently, out of the sealed enclosure. Air flows into the sealed enclosure via the air inlet pipe into the air distribution pipes and then passes through the contaminated soil, thereby volatilizing the VOCs. The air-VOCs mixture is exhausted via the exhaust pipes, the vent pipe, and the vacuum pump. The exhaust-VOC stream may be further processed in a carbon filter or other treatment device, such as a catalytic converter, to remove the VOCs.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Referring to FIGS. 1-5, a containment structure 10 for removing volatile contaminants from contaminated soil is shown. This structure may be used to remove VOCs from contaminated sites wherein immediate removal and management of the contaminated soil is either required by regulation or is determined to be required as an immediate response effort. The apparatus may therefore be used in connection with underground storage tank removals, emergency responses to accidental spills of hazardous materials, and excavation of uncontrolled hazardous material disposal sites, etc.

A granular bed 12 supported on ground surface 13 provides a foundation for containment structure 10. The granular bed 12 is preferably composed of clean sand. A first impervious vapor-tight liner 14 covers the granular bed 12.

Figure 6:
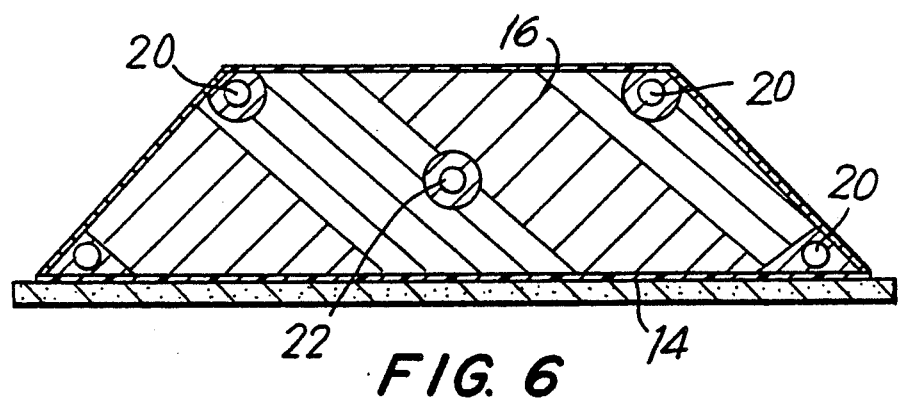
FIG. 6 is a typical cross-sectional view of the system shown in FIGS. 2-5.

The soil 15 containing the VOCs is excavated and stockpiled on top of the first impervious vapor-tight liner 14. As shown in FIG. 6, an air distribution system comprising a plurality of air distribution pipes 20 is positioned within the stockpiled soil so that each air distribution pipe extends substantially the length thereof. An exhaust system comprising a plurality of exhaust pipes 22 (see FIG. 7) is positioned within the stockpiled soil so that each exhaust pipe also extends substantially the length of the stockpile. The distribution and exhaust pipes include a plurality of slots or perforations 23 in order to distribute air into, and exhaust air-VOCs from, the stockpile, respectively.

After stockpiling of the contaminated soil is completed, the air distribution and exhaust systems having been positioned in the soil stockpile, a second, impervious vapor-tight liner 16 is placed over the contaminated soil so that a vapor-tight enclosure 17 is formed between the first and second liners 14 and 16, respectively. Liners 14 and 16 are preferably made of an impervious material, e.g., a polymeric material such as polyethylene or polyvinylchloride, etc. A suitable material is that commercially available from, among others, Permalon under the trade name Ply X 210. The second liner is sealed or welded along side edges 18a, 18b, 18c and 18d thereof. Preferably, the seals are in the form of extrusion welded air tight seams.

Figure 3:
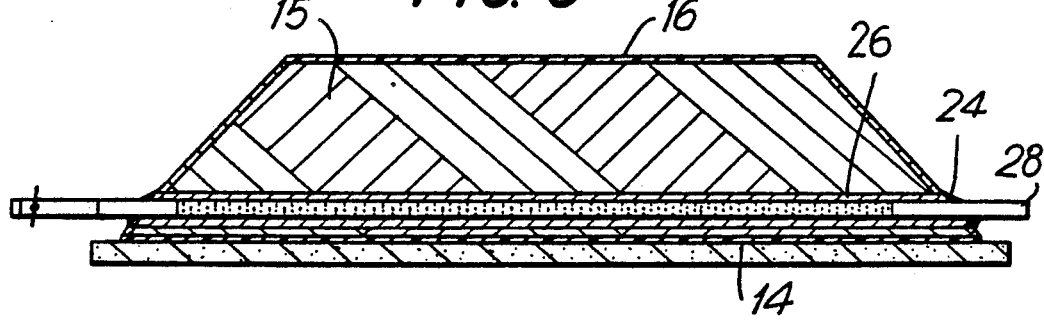
FIG. 3 is a cross-sectional view taken along line A—A of FIG. 2.
Figure 4:
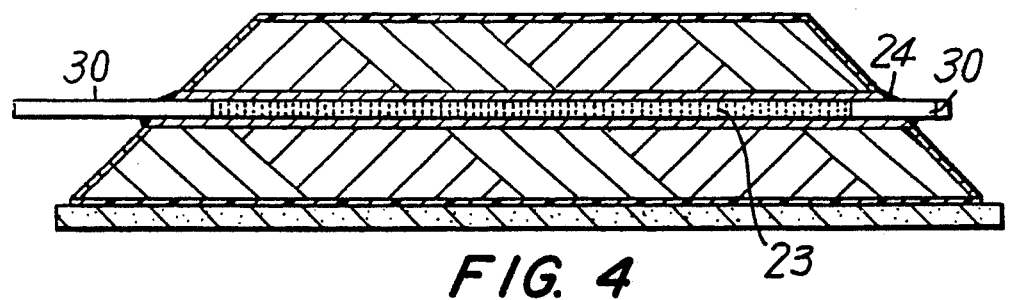
FIG. 4 is a cross-sectional view taken along line B—B of FIG. 2.
Figure 5:
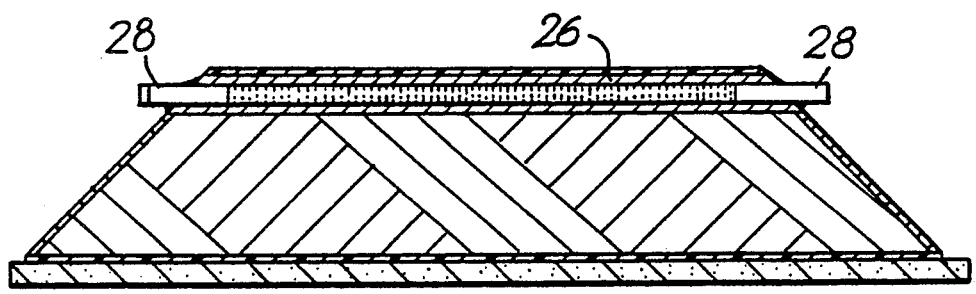
FIG. 5 is a cross-sectional view taken along line C—C of FIG. 2.

As shown in FIGS. 3, 4, and 5, air supply pipe 28 and vent pipe 30 extend outwardly from vapor-tight enclosure 17 through openings 24 formed in the second vapor-tight liner 16. Pipes 28 and 30 protrude from openings 24 and are sealed by vapor-tight boots against the liner.

In a preferred embodiment, the air distribution pipes conform to PVC Schedule D and have solvent welded connections. The inlet and vent pipes 28 and 30 have solid walls extending into the vapor-tight enclosure through openings 24 in vapor-tight liner 16. The air distribution pipes 20 are preferably 4 inches in diameter and contain perforations. The perforations are approximately $\frac{1}{8}$ inch but may broadly vary from 1/16 to $\frac{1}{4}$ inch. The exhaust pipes 22 are preferably 4 inch diameter screen casing pipe. They contain slots 23 which are 0.008 to 0.20 and preferably about 0.01 inches wide.

In order to facilitate even air flow through the system and to prevent the slotted openings in the air distribution and exhaust pipes from becoming clogged with soil particles, beds of filter gravel 26 may be included in the soil stockpile around each pipe. The filter gravel is preferably composed of crushed or uncrushed material free from organic matter. In order to induce air flow through the stockpile, vent pipe 30 is connected to a vacuum source, such as a centrifugal or regenerative blower 34. In order to control the vacuum source, a plurality of ball valves, such as 36, are provided.

In operation, the vacuum pump exhausts enclosure 17 via vent pipe 30. Air enters through air supply pipe 28 and slotted distribution pipes 20, and circulates through the contaminated soil layer in vapor-tight enclosure 17, thereby volatilizing the VOCs therein and liberating them from the contaminated soil. The volatilized contaminants pass into slotted exhaust pipes 22 through slots 23 and are exhausted via vent pipe 30.

Figure 1:
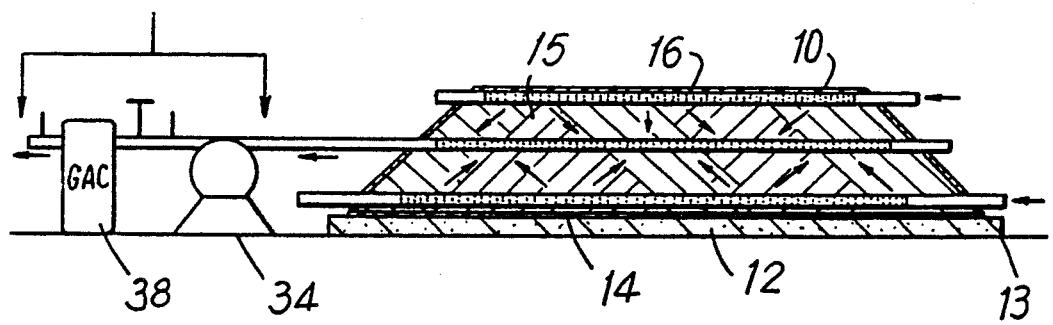
FIG. 1 is a schematic view of a preferred embodiment of the apparatus for removing volatile contaminants from contaminated soil in accordance with the invention.
Figure 2:
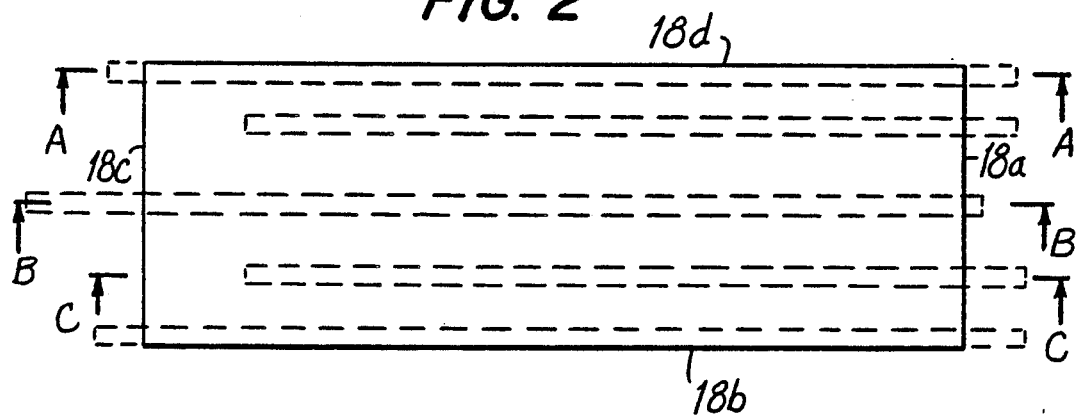
FIG. 2 is a diagrammatic top view of the apparatus of FIG. 1.

As shown in FIG. 1, components may be incorporated as required by state and federal regulation to monitor the performance and remove the contaminants volatilized from the soil. These components may include vapor treatment systems, e.g., a carbon filter or catalytic converter 38, water vapor reduction equipment such as a demister or knockout drum, vapor sampling or monitoring apparatus, (reference numeral 40), flow monitoring devices, pressure monitoring devices, valves and automatic shutdown equipment, and electronic controls.

Figure 7:
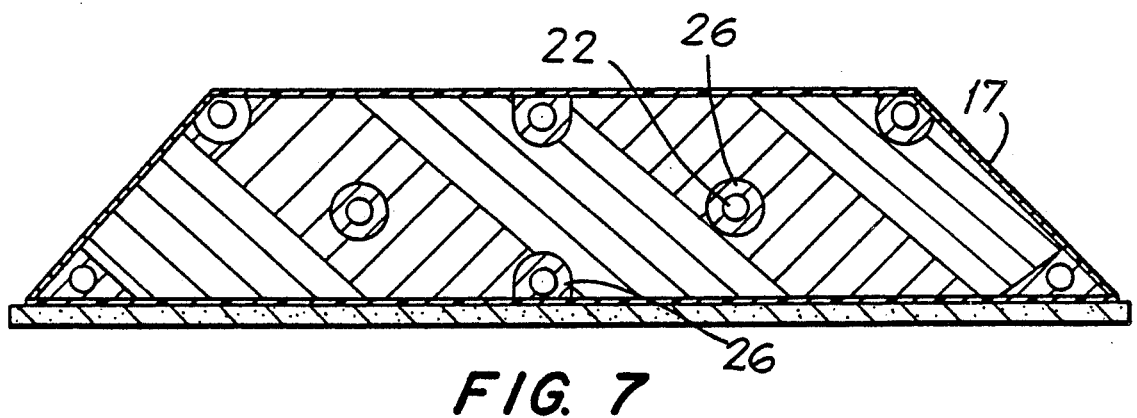
FIG. 7 is a typical cross-sectional view of the system showing a plurality of exhaust pipes.

Larger soil volumes can be treated by expanding the width of the containment structure 17 as shown in FIG. 7. Additionally, several piles can be constructed at a particular site depending on site limiting conditions and vent pipes from these piles could be manifolded to one treatment system.

Variations of the designs described above are within the skill of the art. For example, the air distribution pipes 20 may be manifolded within the vapor-tight enclosure so that only a single air supply pipe breaches the upper liner 16. Similarly, exhaust pipes 22 may be manifolded within the vapor-tight enclosure 17 so that only a single vent pipe is necessary to breach the upper liner 16. The air distribution pipes 20 may be located other than above and below exhaust pipes 22, as shown. Other configurations of the pipes are within the skill of the art.

Since condensation of VOCs in the exhaust pipes 22 may be expected, a condensate collection system may be included as part of the ground-level exhaust pipes. This is accomplished by positioning the exhaust pipes on a grade sloping toward one end of the stockpile and by substituting clear observation pipes at the lower end of the vent pipes emerging from the sealed enclosure to observe buildup of condensate liquid. A valve may be provided at the end of the observation pipe to drain any condensate formed. In another satisfactory embodiment, the sand bed may be graded both lengthwise and widthwise to facilitate condensate runoff in the exhaust pipes and in the vent pipes protruding from the sealed enclosure.

In other embodiments of the invention, as will be understood by those skilled in the art, a forced air system can be incorporated with the vacuum system shown. Air may be blown under positive pressure into air supply pipes 28 and thence to air distribution pipes 20, or, treated exhaust can be recirculated into the inlet pipes thereby creating a totally closed system. Heated air may be used advantageously to avoid condensation of VOCs in the exhaust pipes and to increase the volatility of the contaminants.

What is claimed is:

1. A method for removing volatile contaminants from contaminated soil comprising the steps of:
    (a) excavating soil contaminated with volatile contaminants in liquid and absorbed phases and stockpiling the contaminated soil;
    (b) covering and sealing the contaminated soil with a vapor-tight liner to create a vapor-tight enclosure having air supply and exhaust means; and
    (c) inducing air flow via said air supply means, through the contaminated soil and out said exhaust means to thereby create sufficient negative pressure in the contaminated soil to encourage organic contaminants in the liquid and absorbed phases to achieve a vapor phase; and
    (d) removing the organic contaminants in the vapor phase from said enclosure.

2. A method as recited in claim 1 wherein a plurality of perforated air supply and exhaust pipes are positioned within said soil stockpile.

3. A method as recited in claim 2 wherein the ends of said air supply and exhaust pipes protrude through sealed openings in said liner.

4. A method as recited in claim 2, wherein a layer of filter gravel is positioned in said soil stockpile around said air distribution or said exhaust pipes.

5. A method as recited in claim 1, wherein air is induced to flow through said soil stockpile by drawing a vacuum on said exhaust means.

6. A method as recited in claim 1, wherein air is induced to flow through said soil stockpile by blowing air into said stockpile via said air supply means.

7. A method for removing volatile contaminants from contaminated soil comprising the steps of:
    (a) excavating soil contaminated with volatile contaminants in liquid and absorbed phases and stockpiling said contaminated soil upon a first vapor-tight liner covering a clean sand bed;
    (b) incorporating a plurality of perforated air distribution and exhaust pipes within said stockpile during the stockpiling of said soil;
    (c) covering said stockpile with a second impervious vapor-tight liner having sealable air supply and exhaust vents through which air supply and vent pipes protrude;
    (d) sealing said second liner to said first liner such that a vapor-tight enclosure is formed therebetween;
    (e) applying a vacuum through said vent pipe to induce air flow through the contaminated soil to thereby create sufficient negative pressure in the contaminated soils to encourage organic contaminants in the liquid and absorbed phases to achieve a vapor phase; and
    (f) removing the organic contaminants in the vapor phase from said enclosure.

8. An apparatus for removing volatile contaminants from contaminated soil comprising:
    (a) a vapor-tight support structure upon which excavated soil contaminated with volatile contaminants in liquid and absorbed phases is stockpiled;
    (b) an impervious vapor-tight liner covering and sealing the contaminated soil to create a vapor-tight enclosure;
    (c) means for inducing air flow through the soil stockpiled in said vapor-tight enclosure so that sufficient negative pressure is created in the contaminated soils to encourage organic contaminants in the liquid and absorbed phases to achieve a vapor phase; and
    (d) removing the organic contaminants in the vapor phase from said enclosure.

9. An apparatus as set forth in claim 8 having a plurality of air distribution and exhaust pipes positioned within said vapor-tight enclosure.

10. An apparatus as set forth in claim 8, wherein said liner includes a sealable opening through which an air supply pipe and a vent pipe protrude.

11. An apparatus as recited in claim 8, wherein the protruding ends of said pipes are sealed against said liner by vapor tight boots.

12. An apparatus as recited in claim 8, wherein said structure includes a granular bed comprised of generally clean sand and a vapor-tight liner covering said bed.

13. An apparatus as recited in claim 8, wherein said air induction means is a centrifugal or regenerative blower.

14. An apparatus as recited in claim 8, wherein said air induction means is a vacuum pump associated with said vent pipe.

15. An apparatus for removing volatile contaminants from contaminated soil comprising:
    (a) a generally clean sand bed covered by a first vapor-tight liner upon which excavated soil contaminated with volatile contaminants in liquid and absorbed phases stockpiled;
    (b) a plurality of perforated air distribution pipes positioned within the stockpile of contaminated soil;
    (c) a plurality of perforated exhaust pipes positioned within the stockpile of contaminated soil;
    (d) a second impervious vapor-tight liner covering the stockpile of contaminated soil and being sealed to said first liner to create a vapor-tight enclosure between said first and second liners, said second liner including sealable ports through which air supply and vent pipes protrude; and
    (e) vacuum means associated with said vent pipes to thereby create sufficient negative pressure in the contaminated soil to encourage organic contaminants in the liquid and absorbed phases to achieve a vapor phase, and providing a means for removing the organic contaminants in the vapor phase from said enclosure.

* * * * *